United States Patent Office 3,582,334
Patented June 1, 1971

---

3,582,334
DIAZOTYPE PHOTOPRINTING MATERIALS
Luigi Amariti, Chicago, Ill., assignor to
Eugene Dietzgen Co., Chicago, Ill.
No Drawing. Filed Nov. 7, 1968, Ser. No. 774,206
Int. Cl. G03c *1/52*
U.S. Cl. 96—75          5 Claims

ABSTRACT OF THE DISCLOSURE

Diazotype photoprinting compositions containing 4,4′ 4″ - methylidynetris(N,N-dimethylaniline). In the present system 4,4′,4″ - methylidynetris(N,N - dimethylaniline) prevents finished prints from acquiring a yellowish appearance.

DESCRIPTION OF THE INVENTION

The present invention relates to improved diazotype photoprinting materials. More particularly, the subject invention is directed to photoprinting compositions which produce prints which do not take on an unsightly yellowish appearance.

In diazotype photoprinting processes, a suitable base such as paper is treated with two dye components. One of the components is a diazo compound which is sensitive to light, and the other component is an azo coupling compound. The coupling compound is capable of reacting under proper conditions with the diazo component to form a dye. In making a print, the treated base is exposed to light under a translucent original or master. In those areas of the base which are reached by the light, the diazo compound is at least partially destroyed. In those areas that are beneath opaque lines or designs, the diazo compound is not affected by the light. The print is developed by reacting the retained diazo compound with the coupler to form a highly colored azo dyestuff in precise duplication of the original.

Diazotype reproduction processes are classified as either moist processes or dry processes. In a moist process the base is coated with a diazo compound which is exposed to light under a pattern. Thereafter, color development is brought about by contacting the latent diazo image with a solution of a coupling compound and aqueous alkali. In the dry process the light sensitive layer contains both the diazo compound and a coupler together with acids and various other stabilizing substances. After the treated base has been exposed to light the print is formed by the use of hot aqueous ammonia fumes.

More recently, heat developable diazotype systems have been developed which are feasible from a commercial standpoint. In these systems a layer containing an intimate mixture of a diazo compound, an azo coupling component, and an alkali generating compound is formed on a suitable base. A solution of the various materials is brushed or otherwise applied to the base. Following the removal of volatiles from the liquid coat, the paper, cloth, plastic, etc., is ready for photoprinting. Urea is often used as the alkali generating compound. After exposure of the treated base to light beneath the master, the paper is heated to a sufficiently high temperature to liberate ammonia and cause a reaction between the diazo compound and the coupler.

Although the above systems are satisfactory in many respects such systems have certain deficiencies. One of the features of the diazo process which is most criticized is the slow deterioration of the finished prints, particularly in the nonimage areas. In these areas the couplers and the products of photolysis are slowly oxidized by light until the entire area acquires an unsightly, yellowish appearance. Certain antioxidants such as thiourea and its derivatives have been used to retard this process. The oxidation reaction, however, still goes on although at a reduced rate. Another solution that has been suggested to eliminate the yellowish appearance of copies involves adding certain dyes to the system such as methylene blue. These dyes mask the yellowish background and the finished prints exhibit a somewhat pleasant bluish tint. One of the main objections to the use of dyes, however, lies in the fact that the bluish background is present from the time the print is made. The print has a bluish background, therefore, when it is not needed and it causes a substantial reduction in print contrast.

It is an object of the present invention to provide a diazo system which substantially prevents the finished prints from acquiring a yellowish appearance through oxidation.

Still another object of the invention is to eliminate this problem without causing an initial reduction in contrast.

Other objects will become apparent to those skilled in the art from the following detailed description of the invention.

In general, the present invention involves the discovery that the addition of 4,4′,4″-methylidynetris(N,N-dimethylaniline) to a diazo system accomplishes the objectives set forth above. The subject additive can be incorporated in any of the known diazo systems.

4,4′,4″ - methylidynetris(N,N-dimethylaniline) beside being an excellent antioxidant in its own right has the property of acquiring a bluish tint after long exposure to light, according to the following equation:

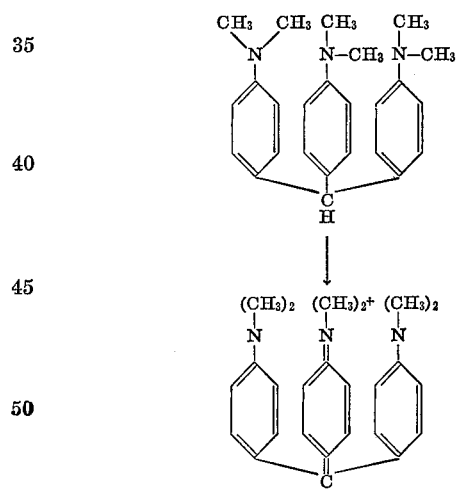

One of the remarkable features of the subject additive lies in the fact that its rate of oxidation is substantially identical to the rate of oxidation of the couplers and the coupling diazo compound decomposition products of photolysis. The finished print, therefore, has no background color when fresh but when the couplers and products of photolysis begin to oxidize the additive undergoes the eraction described above at substantially the same rate with the result that the yellowish color of the finished prints is completely masked.

The following examples illustrate the subject invention.

Example 1

This example shows the use of the subject chemical in a gas developed system. Reproduction paper was coated with the following formulation at the rate of one liter per 65 sq. yds. of paper:

Water—100 cc.
Ethylene glycol—10 cc.
Citric acid—1.8 g.
D Salt [1]—3 g.
p-Diazophenylhexamethyleneimino zinc chloride salt—0.64 g.
Zinc chloride—8 g.
Thiourea—7 g.
2.7% solution of subject chemical in gamma-butyrolactone—0.12 cc.

[1] p-Diazophenylmorpholine zinc chloride salt.

The coated paper was dried. The paper was then exposed to ultraviolet light beneath a translucent original. In those areas of the base which were reached by the light the diazo compound was at least partially destroyed. The paper was developed by exposure to moist ammonia fumes for 5 seconds. A blueline reproduction was formed.

The print was subjected to accelerated aging which consisted of exposure to intense ultraviolet light for 8 hours. After the exposure period virtually no yellow could be detected. A print produced with the same formulation was also subjected to sunlight for a 2 week period. Once again, virtually no yellow could be detected in the print at the end of that period.

Example 2

In this example another formulation (this time an intermediate speed blue) was coated on diazo paper at a rate of one liter per 65 sq. yds. The coated paper was dried, exposed to ultraviolet light beneath a translucent master, and then was subjected to moist ammonia fumes as described in Example 1. The prints produced in this manner on being subjected to the aging tests set forth in Example 1 once more did not show any detectable yellow color.

Example 3

In this example a sepia intermediate was prepared by using the following formulation:

Water—100 cc.
Zinc salt of metabenzenedisulfonic acid—8 g.
Tartaric acid—6 g.
Resorcinol—1.5 g.
Alpha-resorcylic acid—1.8 g.
4-diazo-2,5-dimethoxyphenylmorpholine zinc chloride salt—2.25 g.
p-Diazophenylmorpholine—1.25 g.
Thiourea—5 g.
2.7% solution of subject chemical in gamma-butyrolactone—2 cc.

A print formed by exposure to ultraviolet light through a translucent original and developed with moist ammonia fumes had excellent shelf life and did not take on a yellowish appearance after the accelerated aging tests described above.

Example 4

This example shows the use of the present invention in connection with a heat developable system. Standard diazo paper was coated with the following formulation at the rate of one liter per 70 sq. yds.:

Water—100 cc.
Cadmium sulfate—18 g.
Urea—40 g.
Thiourea—2 g.
Metabenzenedisulfonic acid—1.5 g.
D Salt—6 g.
p-Diazophenylmorpholine—4.5 g.
Syloid 244 (silica—1–100 micron particle size)—5 g.
Polyvinyl acetate emulsion—5 cc.
Starch—5 g.
2.7% solution of subject chemical in gamma-butyrolactone—0.2 cc.

The coating was dried and then was subjected to ultraviolet light beneath a translucent master. The paper was then heated to 120° C. for about 3 seconds to produce ammonia and thereby cause a coupling reaction. The print developed by this process was subjected to the aging tests described in connection with Example 1 and was found to be free of yellow discoloration.

Example 5

This example shows the use of the subject process in connection with a wet system. In the process the following formulation was coated on one component diazo paper:

Water—100 cc.
Citric acid—2 g.
Ammonium sulfate—20 g.
Naphthalenetrisulfonic acid trisodium salt—100 g.
Saponin (surfactant)—2 g.
1-diethylamino-2-chloro-4-diazobenzene zinc chloride salt—50 g.
2.7% solution of subject chemical in gamma-butyrolactone—0.5 cc.

The coated paper was dried and then was subjected to ultraviolet light through a translucent master. The print was developed with the following solution:

Water—100 cc.
Phloroglucinol—5 g.
Resorcinol—4 g.
Potassium tetraborate—70 g.

The print that was produced was subjected to the aging tests described in Example 1 and was found to be free of yellow discoloration.

4,4',4''-methylidynetris(N,N-dimethylaniline) is available in the form of powder. The powder can be added directly to the systems, although it is preferred that the subject chemical be dissolved in a suitable solvent such as gamma-butyrolactone. The antioxidant can be added to the paper along with the diazo coating composition or can be added in a separate step. The amount of 4,4',4''-methylidynetris(N,N-dimethylaniline) used in the composition can vary widely. Ordinarily, from 0.05 cc.–100 cc. of a 2.7% solvent solution of the subject material per liter of coating composition will perform satisfactorily. A more preferred range would be from 0.1 cc. to 20 cc. of a 2.7% solvent solution of the subject chemical per liter of coating composition.

A wide variety of diazo compounds can be used in the subject formulations. The nature of the particular diazo compound does not constitute a part of the subject invention. It is preferred to employ as the diazo compound one of the commonly used stabilized diazonium salts, preferably the zinc chloride double salt. Other stabilized derivatives may be used, for example, the cadmium chloride or stannnic chloride double salts, or the fluoroborates.

Exemplary diazo compounds which may be employed are the diazonium salts obtained by diazotization of the following amines:

p-amino-N,N-dimethylaniline
p-amino-N,N-diethylaniline
p-amino-N,N-dipropylaniline
p-amino-N-ethyl-N-propylaniline
p-amino-N-ethylaniline
p-amino-N-ethyl-N-$\beta$-hydroxyethylaniline
p-amino-N-methyl-N-$\beta$-hydroxyethylaniline
p-amino-N,N-di-$\beta$-hydroxyethylaniline
p-amino-m-ethoxy-N,N-diethylaniline
p-amino-N-ethyl-o-toluidine
p-amino-N-ethyl-m-toluidine
p-amino-N,N-diethyl-m-toluidine
p-amino-N-ethyl-N-hydroxyethyl-m-toluidine
p-amino-N-ethyl-N-benzylaniline
p-amino-N-ethyl-N-$\beta$-hydroxyethyl-m-toluidine
N-p-amino-phenylmorpholine
N-(2,5-diethoxy-4-aminophenyl)-morpholine p-amino-diphenylamine
3-aminocarbazole
and the like.

It is preferred to employ a diazonium salt, in the form of a stabilized derivative as indicated above, having the following structural formula:

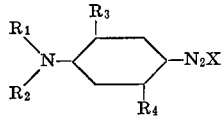

X represents an acid anion, such as a halide or a sulfate ion, $R_1$ is hydrogen or an aliphatic radical, preferably alkyl, aralkyl, hydroxyalkyl, or a radical which together with $R_2$ and N forms a cyclic basic amine radical. $R_2$ is an aliphatic radical, preferably alkyl, aralkyl, hydroxyalkyl, or a radical which together with $R_1$ and N forms a radical of a cyclic basic amine. $R_3$ and $R_4$ may be hydrogen, alkyl, or alkoxy. The several alkyl radicals are preferably lower alkyl radicals. In addition to these preferred compounds, it is contemplated that other compounds might be employed, such as those having the foregoing composition and which contain an acyl group as $R_1$ and/or $R_2$.

The following azo coupling agents are among those which can be used in the subject process and in preparing the subject products:

2,3-dihydroxynaphthalene
2,3-dihydroxynaphthalene-6-sulfonic acid
Resorcinol
Acetoacetanilide
7-hydroxy-1,2-naphthimidazole
1-phenyl-3-methyl-5-pyrazolone
2-naphthol-3,6-disulfonic acid
and the like.

When employing the coupling components having a high coupling energy, such as resorcinol and acetoacetanilide in heat developed dry systems, it is advisable to select a diazo compound having a small coupling energy, and the diazo layer may require a higher degree of stabilization against precoupling.

As is known in the art, it is desirable to add an acid stabilizing agent to the composition in dry systems. These agents include such acids as sulfuric acid and organic acids such as malonic, gluconic, cyanoacetic, maleic, tartaric, citric, diglycolic, oxalic, acetic, and malic acids, and anhydrides of such acids, e.g., the lactones. Reference to such acids is intended to include the equivalent anhydrides. Other acids which have been found to be of substantial help in maintaining the stability of the compositions and improving shelf life are aromatic sulfonic acids such as m-benzenedisulfonic acid and inorganic acids such as sulfuric acid.

Preferred compounds for use in heat developable systems which produce an alkaline reaction when heated include those which yield ammonia by decomposition or dissociation. The compounds include, for example, the ureas, i.e., urea and its derivatives, in particular, guanidine, alkyl substituted urea and alkyl substituted guanidines, said alkyl groups containing from 1 to 4 carbon atoms such as methyl urea, ethyl urea, propyl urea, and butyl urea, hydroxy ureas such as hydroxy methyl urea and hydroxy ethyl urea. It is often advantageous to use a plurality of such compounds, such as mixtures of urea and guanidine, and urea and tetramethyl guanidine. Other compounds of this type which can be used in the subject process include sulfamide and cyanamide.

Organic nitrogen base salts which produce an alkaline reaction when heated may be employed, particularly salts of amines with volatile or decomposable acids such as acetic acid, malonic acid, gluconic acid, and other heat fugitive acids. Amino-paraffins and especially hydroxylated derivatives thereof or amino alcohols are preferred, particularly those having low volatility, substantial alkalinity, and no odor, and which are resistant to oxidation. Examples of such amines are tri-(hydroxymethyl)-aminoethane, 2 - amino - 2 - methyl-1, 3-propanediol, ethanolamine, diethanolamine, and ethyl diethanolamine. These materials are used in conjunction with appropriate acid stabilizers. The aforementioned guanidines are also basic, and their basicity may provide or contribute to the necessary alkaline reaction, with or without decomposition thereof to produce ammonia. Other compounds which are contemplated include the ammonium salts of weak acids, such as ammonium gluconate, ammonium acetate, ammonium carbonate, ammonium diglycolate, and ammonium oleate. The compounds containing the ammonium ion presently are not preferred as the materials produced therewith tend to have a reduced shelf life.

The subject formulations can be used in either a direct printing process or a reflex process. Paper, cloth, plastic sheet materials, plastic impregnated materials, and metal bodies all my be employed as the base material in the direct printing process, provided that the material is not so heat-conductive as to interfere with the process. The reflex process requires that the base be capable of transmitting the heat-producing radiations, and conducting the heat from the original to the sensitive layer. Various drafting and printmaking papers are suitable, as are regenerated cellulose, synthetic plastic and other such sheet materials capable of transmitting the radiation without substantial absorption thereof.

The diazo compound, coupling component, said stabilizer, copolymer-metal sulfate, and alkali generator are applied to the base in solution in heat developable systems by one of the conventional coating methods. The materials are preferably dissolved in water, and the one-phase liquid coat is dried by evaporation to a residual moisture content of preferably less than about 5%. A volatile organic solvent may also be employed, although such is not ordinarily necessary and therefore is not preferred due to the increased cost and normal disadvantages attendant upon such use. It is necessary that the solvent be one which can be removed substantially completely in the drying process, so as not to have an adverse effect on the shelf life.

The diazo compound is preferably employed in a proportion of about 1 to 10% by weight on the basis of the water or other solvent content of the sensitizer composition. The composition is applied to the base at standard rates of application, for example, application to diazo process paper is made at the rate of about 10 to 50 grams of diazo compound per one thousand square feet.

The coupling component is employed in a proportion preferably at least sufficient to constitute a stoichiometric amount with respect to the diazo compound, and preferably in substantial excess. Thus, about 2 to 15 equivalents of coupler per equivalent of diazo compound is preferred in most cases.

In heat developable systems the quantity of alkaline reacting material employed should be sufficient to elevate the pH of the sensitized layer to that required for coupling, and this quantity will likewise depend upon the characteristics of the material and of the other substances in the sensitive layer. It has been found, for example, that compounds of the type of urea may be employed in a weight ratio to diazo compound of about 3–50:1. The proportion of an amino alcohol while varying with its basicity and molecular weight, will frequently be in the range of about 0.5–10 parts by weight to 1 part of diazo compound. Other compounds may be employed at rates corresponding thereto on the basis of the ammonia evolved or the resulting pH change.

The conditions of time and temperature for developing the image are selected for the system employed to produce the necessary alkaline reaction without undesirable decomposition of the diazo compound. The results are generally advantageous when the sensitive layer is subjected to a relatively high temperature of about 150° C. to 220° C. for a short time, ranging from a few seconds to about a minute. While rapid development is preferred, the materials can be heated for a longer period of time at a lower temperature. As an example, the temperatures reached in the sensitive layers can be about 205° C. to 220° C. for a period of about 6 to 15 seconds. These rates are very advantageous and enable a number of copies to be made in a short period of time.

Such temperatures may be provided in the sensitive layer in a number of ways. Thus, the primary source of the necessary heat may be a quartz lamp used in conjunction with an elliptical reflector so as to provide an intense zone of near infrared and infrared light. The lamp may produce a color temperature of about 2750° K. with about 1500 watts. The reflector ellipse dimensions may be 0.750 inch for the minor axis and 0.845 inch for the major axis. The tungsten element of the lamp is located at one focus of the ellipse, and the surface of the original or master at the other.

I claim:

1. Diazotype photo reproduction material which comprises: a base and a composition coated on said base, said composition including (1) a coupling diazo compound, and (2) 4,4',4''-methylidynetris(N,N-dimethylaniline), which oxidizes and acquires a bluish tint when exposed to light, and being present in an amount sufficient to counteract the yellowing caused by the oxidation of a coupling component and the coupling diazo compound decomposition products of photolysis.

2. Diazotype photo reproduction material which comprises: a base and a composition coated on said base, said composition including (1) a coupling diazo compound, (2) an azo coupling component, and (3) 4,4',4''-methylidynetris(N,N-dimethylaniline), which oxidizes and acquires a bluish tint when exposed to light, and being present in an amount sufficient to counteract the yellowish caused by the oxidation of a coupling component and the coupling diazo compound decomposition products of photolysis.

3. Diazotype photo reproduction material which comprises: a base and a composition coated on said base, said composition including (1) a coupling diazo compound, (2) an azo coupling component, (3) 4,4',4''-methylidynetris - (N,N - dimethylaniline), which oxidizes and acquires a bluish tint when exposed to light, and being present in an amount sufficient to counteract the yellowing caused by the oxidation of a coupling component and the coupling diazo compound decomposition products of photolysis, and (4) a compound producing an alkaline reaction when heated.

4. A print prepared by exposing a supported layer of a composition containing a coupling diazo compound to actinic light beneath a translucent master, and thereafter causing a coupling reaction between the remaining diazo compound and an azo coupling component, said print containing 4,4',4'' - methylidynetris(N,N-dimethylaniline), which oxidizes and acquires a bluish tint when exposed to light, and being present in an amount sufficient to counteract the yellowing caused by the oxidation of a coupling component and the coupling diazo compound decomposition products of photolysis.

5. A process for inhibiting the formation of a yellow color in a print prepared by exposing the supported layer of a composition containing a coupling diazo compound to actinic light beneath a translucent master, and thereafter causing a coupling reaction between the remaining diazo compound and an azo coupling component, which method comprises incorporating in said composition 4,4',4''-methylidynetris(N,N-dimethylaniline), the amount of said 4,4',4''-methylidynetris-(N,N-dimethylaniline) incorporated in said composition being from 0.05 to 100 cc. of a 2.7% solvent solution per liter of said coating composition.

References Cited

UNITED STATES PATENTS 3,164,469   5/1970   Behmenburg _____ 96—49

OTHER REFERENCES

Inst. of Paper Chem., No. 220, Weiner and Roth, 1965, pp. 22 and 56.

MURRAY KATZ, Primary Examiner

U.S. Cl. X.R.

96—91; 117—36.8